Oct. 23, 1923. 1,471,456
T. A. ERRETT
OXYACETYLENE WELDING AND CUTTING TORCH
Filed Sept. 11, 1919 2 Sheets-Sheet 1
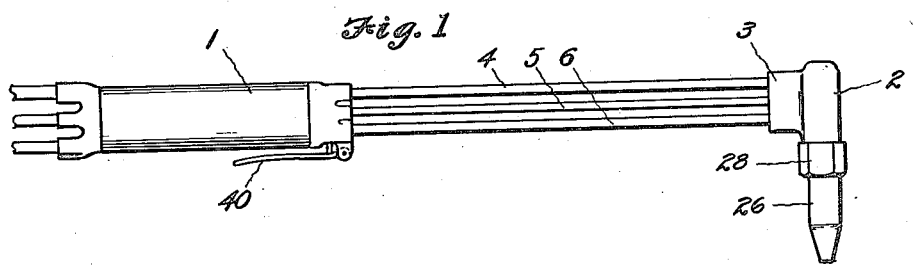
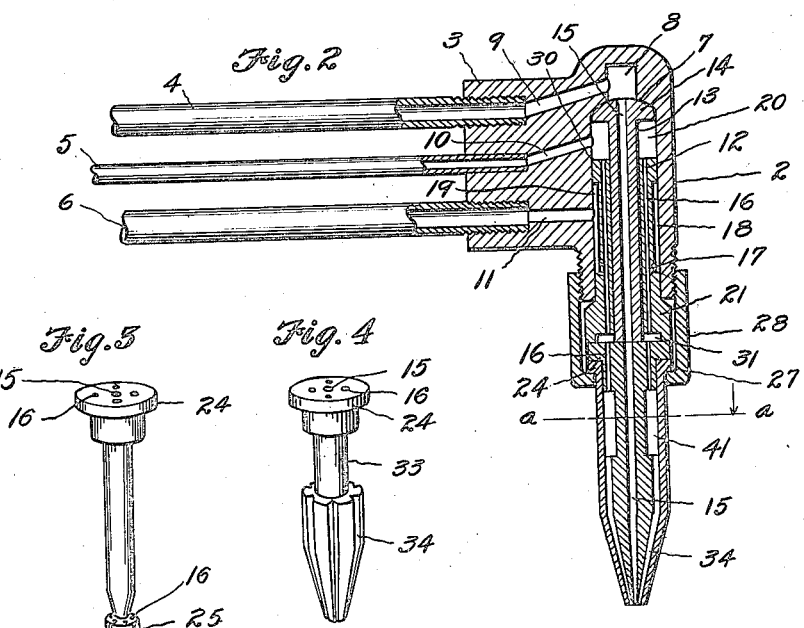
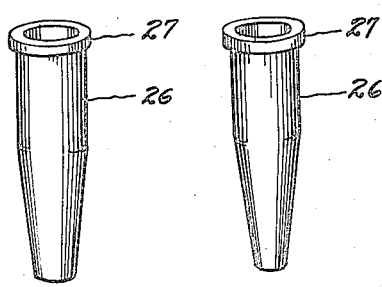
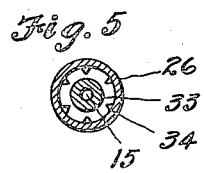
Inventor
THOMAS A. ERRETT
By Reynolds Took
Attorneys Oct. 23, 1923. 1,471,456
T. A. ERRETT
OXYACETYLENE WELDING AND CUTTING TORCH
Filed Sept. 11, 1919 2 Sheets-Sheet 2
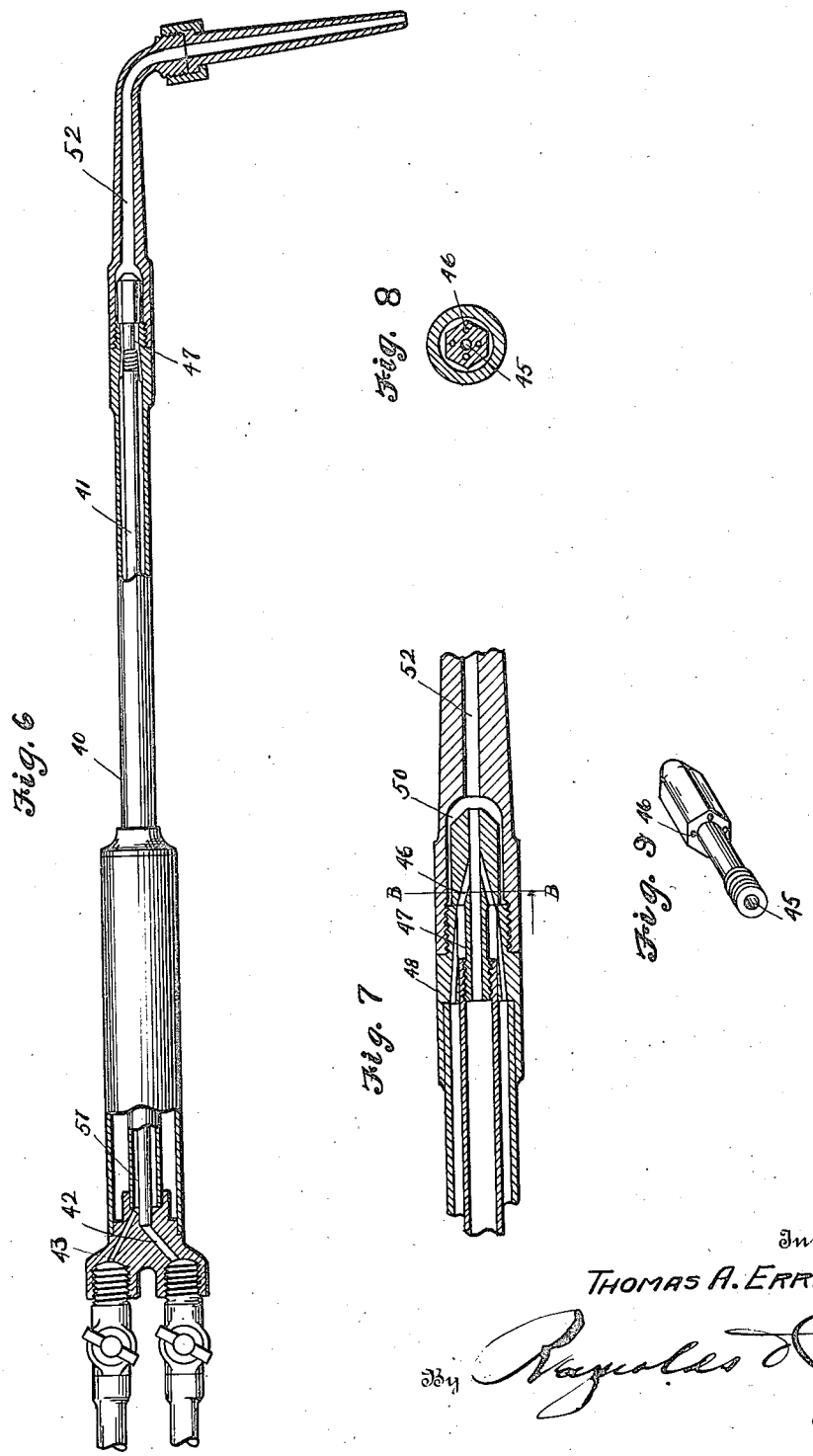
Inventor
THOMAS A. ERRETT
By
Attorney Patented Oct. 23, 1923.

1,471,456

UNITED STATES PATENT OFFICE.

THOMAS A. ERRETT, OF SEATTLE, WASHINGTON, ASSIGNOR, BY MESNE ASSIGNMENTS, TO MODERN TORCH CO. INC., A CORPORATION OF WASHINGTON.

OXYACETYLENE WELDING AND CUTTING TORCH.

Application filed September 11, 1919. Serial No. 323,137.

*To all whom it may concern:*

Be it known that I, THOMAS A. ERRETT, a citizen of the United States, and resident of the city of Seattle, county of King, State of Washington, have invented certain new and useful Improvements in Oxyacetylene Welding and Cutting Torches, of which the following is a specification.

This invention relates to new and useful improvements in oxy-acetylene or oxy-hydrogen cutting and welding torches, in which oxygen and acetylene gases, or oxygen and hydrogen gases are intimately mixed to form a circular pre-heating flame in the center, whereby the pre-heating flame will always be in advance of the cutting jet regardless of the position or the movement of the torch.

This invention is in the nature of an improvement in oxy-acetylene cutting and welding torches embodied in my co-pending application filed August 7, 1918, Serial No. 248,817. The differentiations between the two constructions resides largely in the means whereby the gases may be more intimately mixed during their passage through the mixing chamber and the tip, thereby preventing back-firing resulting in the flame working back through the gas passages of the torch and causing the flame to break and damage the head, and frequently causing dangerous explosions.

A further object resides in the construction of a chamber in which gases are injected and intimately mixed before passing into the annular chamber embodied within the tip.

A further object resides in the construction of the injection type of torch wherein leakage of high pressure gases into the mixing chamber of the low pressure gases is precluded.

A still further object resides in the construction of this type of torch rendering the workable parts more easily machined and more accessible to quick disassembly without having to dismantle the torch in its entirety.

One of the most essential and novel features of this improvement resides in the provision for expansion and contraction within the mixing chamber.

The invention consists of a novel arrangement, construction and combination of parts as will be more fully described in the following specification, illustrated in the drawings and then particularly defined in the claims.

In the drawings, Figure 1 is a side elevation of the device, Figure 2 is a sectional elevation of the same, Figure 3 is a perspective of an internal mixing device preferably for acetylene gases embodied within the tip, Figure 4 is a perspective view of a modified form of construction, preferably employed for hydrogen gases, Figure 5 is a plan view taken along line A—A of Figure 2, Figure 6 is an elevation, partly in section, of an alternative form of construction, Figure 7 is a sectional elevation of the same, Figure 8 is a plan view taken on line B—B of Figure 7, and Figure 9 is a perspective view of a detail thereof.

Referring more particularly to the drawings, wherein like reference numerals indicate like parts, the numeral 1 represents the shank or handle end of the casing wherein is embodied the passage ways for the respective pipes, through which separate gases are conveyed from the intake valve (not shown) insertible into the shank 1.

The torch, as shown, consists of an elongated cylindrically shaped member 2 that is cored out from its lower end and having formed therein a conically shaped seat near the upper extremity and terminating with the cored-out portion slightly reduced in diameter.

A lateral flange 3 formed integral with the member 2 serves as the connecting means for the respective pipes 4, 5 and 6, the ports of which are disposed to register with apertures 9, 10 and 11, of the flange that communicates with the internal chamber of the torch.

Insertible within this chamber is an elongated sleeve 12 having a tubular plug 13 extending longitudinally therethrough with a conically shaped head 14 upon its upper end that is normally in abutment with the conically shaped seat 7 of the internal chamber.

This plug is provided with an orifice 15 through its center for the passage of high pressure oxygen that enters its upper port from the chamber 8.

The sleeve 12 is further provided with a plurality of smaller apertures 16 that extend longitudinally through the shell circumferentially the plug 13, and each of these orifices are disposed to register with by-passes or apertures 17, respectively, that extend transversely through the shell of the plug for the reception of oxy-hydrogen of oxy-acetylene gases that enter from a chamber 18 formed by the outer surface of the sleeve and the inner peripheral surface of the torch member 2. A collar 30 upon the upper end of the plug precludes the intermixture of the hydrogen or acetylene gases with the low pressure oxygen from the chamber 20, and this chamber is formed by the head of the plug 13 when in its extended position, as shown in Figure 2. Upon the lower end of the sleeve 12 is provided a shoulder 21 that extends against the lower peripheral edge of the torch member 2 and hence precludes the escapement of gases around its outer edges.

Disposed in abutting contact with the lower end of the plug 12 are either of the interchangeable tips 22 and 23, the selection of which depending upon whether acetylene or hydrogen gas is employed. In Figure 3 the tip, as shown, is preferable when acetylene gas is used. It consists of an elongated member with collars 24 and 25 upon its upper and lower ends, and with an orifice 15 through its center extending longitudinally thereof, and likewise the same number of small orifices 16 that project through the upper and lower collars.

When the upper end of the tip is placed into alinement with the lower end of the sleeve 12, and the plug 13 being forced upwardly until the head thereof comes into abutment with the seat 7, the chambers 8 and 20, respectively, are formed thereby, and the port 15 registers with the port 15 of the tip. By a slight offset in the lower end of the sleeve 12 a chamber 31 is established for the mixture of the oxy-acetylene gases.

In Figure 4 the tip is slightly modified in construction for the application of hydrogen gas, the stem 33 being much shorter and having a fluted collar 34 provided on its lower end that tapers to a point. These tips are inserted selectively into taper shaped outer casings 26, the upper ends of which are caused to abut against the lower face of the collar 34. Beads 27 around their upper ends serve as a means for securing the tips in contact with the sleeve 12 which is effected by means of a union coupling 28 that engages said beads, and having its upper end threaded to engage the lower shanked end of the torch.

It can be observed that the heated gases within the chambers 18 and 31 respectively will cause the sleeve 12 to become heated, and consequently will expand, the upper end of which being free to move upwardly within the chamber 20 provided the space for such expansion and likewise contraction, without affecting the valve seat of the plug 13, when the heated parts become cooled.

The operation of the torch may be described as follows:

By the pressure of the hand upon the valve 40 the passage of the respective gases through the pipes 4, 5 and 6 is controlled. Acetylene or hydrogen gas is first introduced through the pipe 6 into the annular chamber 18 where it impinges against the walls thereof forming a vapor and passing outwardly through bypasses 17 into the small apertures 16 that are provided circumferentially the sleeve 12 where such gas becomes intimately mixed with the low pressure oxygen introduced from the pipe 5 into the annular chamber 20, thence into the aperture 16.

The mixed gases then enter the annular chamber 31 expanding therein and becoming atomized and escape through orifice 16 into the last of the annular mixing chambers 41 formed in the tip. When acetylene is employed this chamber is of considerable length, as shown by the construction of the tip in Figure 3, therefore, providing for considerable expansion for the atomizing of the gases before such escape into a spray outwardly through the apertures 16 into the jet of high pressure oxygen that passes from the pipe 4 into the chamber 8, and thence outwardly through the port 15 at the lower end of the torch, thus forming a welding flame out of the atomized mixture of the oxy-acetylene gases.

In Figure 6 is shown a modified form of construction particularly adapted for cutting. The construction consists of an elongated torch member 40 with a tube 41 extending therethrough that registers at its top with the port of a passage 42 that delivers the high pressure oxygen from the upper end of the torch member 40. The passage 53 surrounding the tube 41 registers with the port of the passage 43, through which oxy-acetylene gases are delivered.

Upon the lower end of the torch member 40 is attached a plug 44 that has a central passage 45 that extends lengthwise thereof. The lower end of the plug being of increased diameter through which a series of passages 46 are provided that communicate with the central passage 45. The lower construction of this torch member 40 is such that when the plug 44 is screwed up tightly the combustion chamber 47 is formed between the outer periphery of the plug and the inner wall of the union connection 48 of the torch member 40. This combustion chamber serves to atomize the gases. The mixture thence passes through orifices 49, into the central passage 45 from whence such gases are discharged into expansion chambers 50, and are thence expelled through the central passage 52 of the tip into the atmosphere at the end thereof, thereby forming an intensified cutting jet.

What I claim to be new and desire to protect by Letters Patent is:

1. A welding and cutting torch in combination comprising a head cored out from its lower extremity for the reception of gases, a plug therein provided with a passage through its center extending lengthwise thereof adapted to register with a mixing chamber formed thereby within the upper end of said head, a telescopically disposed sleeve around said plug provided with a plurality of passages extending throughout its length, each of said passages communicating with transverse passages through its outer periphery, said sleeve adapted to form independent mixing chambers for low pressure and acetylene gases that register respectively with the transverse and longitudinal passages of said sleeve, a tip, a plug within said tip having a passage extending longitudinally from end to end and a plurality of longitudinal passages in registry with an intermediate chamber around its outer periphery, and means for securing said tip and head together whereby the upper and lower plugs will be held in functional position.

2. A welding and cutting torch, comprising a head for the reception of gases and a tip for the discharge thereof, a plug for said head; said plug having a movably disposed sleeve to form a mixing chamber for the gases and to provide for expansion and contraction thereof, due to varying temperatures of said head, and means for maintaining said tip, sleeve and plunger in functional position.

Signed at Seattle, Washington, this 19 day of Aug., 1919.

THOMAS A. ERRETT.